United States Patent
Taaghol

(10) Patent No.: US 7,840,687 B2
(45) Date of Patent: Nov. 23, 2010

(54) GENERIC BOOTSTRAPPING PROTOCOL (GBP)

(75) Inventor: Pouya Taaghol, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 255 days.

(21) Appl. No.: 12/036,947

(22) Filed: Feb. 25, 2008

(65) Prior Publication Data

US 2009/0019167 A1    Jan. 15, 2009

Related U.S. Application Data

(60) Provisional application No. 60/949,192, filed on Jul. 11, 2007.

(51) Int. Cl.
G06F 15/16    (2006.01)
(52) U.S. Cl. .................................... 709/228
(58) Field of Classification Search .................. 709/228
See application file for complete search history.

(56) References Cited

U.S. PATENT DOCUMENTS

| | | | |
|---|---|---|---|
| 7,581,249 B2 * | 8/2009 | Bussiere et al. | 726/22 |
| 2003/0208577 A1 * | 11/2003 | Grigsby | 709/223 |
| 2005/0108568 A1 * | 5/2005 | Bussiere et al. | 713/201 |
| 2006/0034256 A1 * | 2/2006 | Addagatla et al. | 370/352 |
| 2007/0150560 A1 * | 6/2007 | Zhang et al. | 709/220 |
| 2008/0108321 A1 | 5/2008 | Taaghol | |
| 2008/0310425 A1 * | 12/2008 | Nath et al. | 370/395.54 |

* cited by examiner

*Primary Examiner*—Wing F Chan
*Assistant Examiner*—Tesfay Yohannes
(74) *Attorney, Agent, or Firm*—Schwabe, Williamson & Wyatt, P.C.

(57) ABSTRACT

Embodiments of methods and apparatus for discovering a bootstrapping server by a mobile station, and bootstrapping the mobile station are disclosed. In some embodiments, a mobile station discovers a remotely disposed bootstrapping server; transmits wirelessly a bootstrap request to the bootstrapping server; and receive wirelessly a bootstrap response from the bootstrapping server in response to the transmitted bootstrap request. Additional variants and embodiments are also disclosed.

14 Claims, 5 Drawing Sheets

GENERIC BOOTSTRAPPING PROTOCOL (GBP)

CROSS REFERENCE TO RELATED APPLICATIONS

The present application claims priority to U.S. Provisional Patent Application No. 60/949,192 filed Jul. 11, 2007 entitled, "GENERIC BOOTSTRAPPING PROTOCOL (GBP)."

TECHNICAL FIELD

The present disclosure relates generally to wireless communication systems, and more particularly, to methods and apparatus for providing a generic bootstrap protocol.

BACKGROUND

There is ongoing interest in developing and deploying mobile networks which may facilitate transfer of information at broadband rates. These networks are colloquially referred to herein as broadband wireless access (BWA) networks and may include networks operating in conformance with one or more protocols specified by the 3rd Generation Partnership Project (3GPP) and its derivatives or the Institute for Electrical and Electronic Engineers (IEEE) 802.16 standards (e.g., IEEE 802.16-2005 Amendment), although the embodiments discussed herein are not necessarily so limited. IEEE 802.16 compatible BWA networks are sometimes referred to as WiMAX networks, an acronym that stands for Worldwide Interoperability for Microwave Access, which is a certification mark for products that pass conformity and interoperability tests for the IEEE 802.16 standards.

It is predicted that many different device types may be enabled by mobile broadband wireless technologies. Such devices may include notebooks, ultra mobile PCs (UMPCs), handheld mobile devices, and other consumer electronics such as MP3 players, digital cameras, etc. A mobile broadband service provider may desire to activate and enable subscriptions for these device types.

BRIEF DESCRIPTION OF THE DRAWINGS

Embodiments of the invention will be described by way of exemplary embodiments, but not limitations, illustrated in the accompanying drawings in which like references denote similar elements, and in which.

DETAILED DESCRIPTION OF ILLUSTRATIVE EMBODIMENTS

Figure 1:
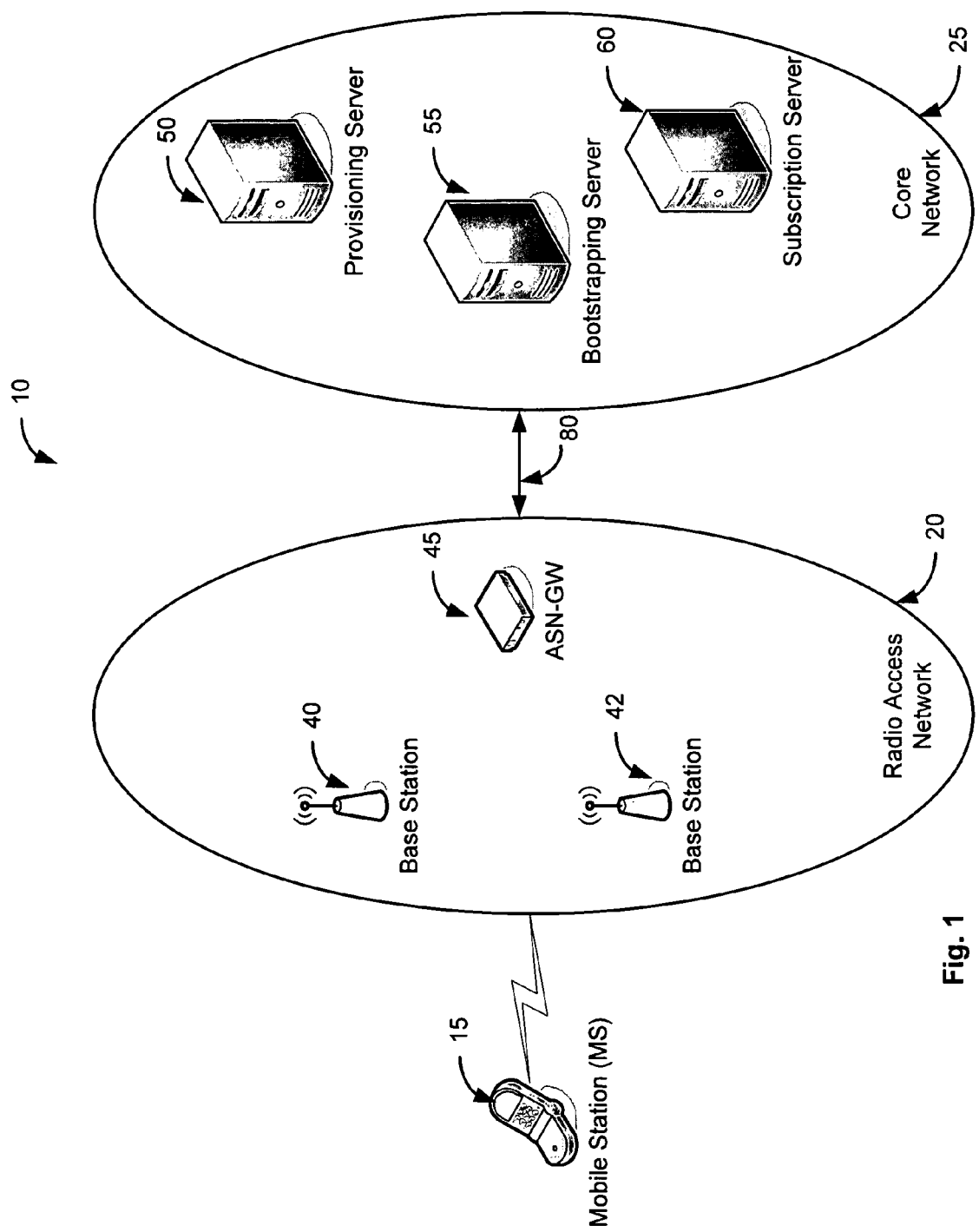
FIG. 1 is an exemplary block diagram illustrating a broadband wireless access (BWA) network architecture in accordance with various embodiments of the present invention.

Illustrative embodiments of the invention include, but are not limited to, methods and apparatuses for providing a generic bootstrap protocol.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the invention. This application is intended to cover any adaptations or variations of the embodiments discussed herein. Therefore, it is manifestly intended that the embodiments of the invention be limited only by the claims and the equivalents thereof.

While example embodiments may be described herein in relation to broadband wireless access for wireless metropolitan area networks (WMANs) such as WiMAX networks, embodiments of the invention are not limited thereto and can be applied to other types of wireless networks where similar advantages may be obtained. Such networks include, but are not limited to, wireless local area networks (WLANs), wireless personal area networks (WPANs) and/or wireless wide area networks (WWANs) such as cellular networks and the like.

The following embodiments may be used in a variety of applications including transmitters and receivers of a mobile wireless radio system. Radio systems specifically included within the scope of the embodiments of the present invention include, but are not limited to, network interface cards (NICs), network adaptors, base stations, access points (APs), gateways, bridges, hubs and satellite radiotelephones. Further, the radio systems within the scope of embodiments of the invention may include satellite systems, personal communication systems (PCS), two-way radio systems, global positioning systems (GPS), two-way pagers, personal computers (PCs) and related peripherals, personal digital assistants (PDAs), personal computing accessories and all existing and future arising systems which may be related in nature and to which the principles of the embodiments could be suitably applied.

In conventional cellular communication models, a communication device (e.g. a cell phone or a network interface card (NIC)) is typically manufactured for a specific service provider (SP), which in turn sells the device to end users. SPs operate network infrastructure and provide wireless access to subscribers. At the time of sale, a device is typically set up for accessing the SP's network, which is referred to as "provisioning." This conventional model is thus predicated on the SP's control of manufactured equipment which may be used in its wireless network(s) as well as provisioning these devices for the user at the point of sale (POS).

However, in anticipation of many different types of equipment, such as those mentioned previously, being used in BWA networks (such as WiMAX networks), an SP is less likely to have complete control over the manufacture of all devices which may potentially be used in its BWA network. Furthermore, since this wide variety of devices may be made available by many different vendors, a POS provisioning approach may not be adequate. Accordingly, a dynamic over-the-air (OTA) provisioning approach may be used to enable these devices to communicate over a SP's BWA network.

Before a BWA compatible communication device connects to a provisioning server over an OTA link to get provisioned, it is often necessary for the communication device to be bootstrapped with initial information relating to the provisioning server (e.g., provisioning server Uniform Resource Identifier (URI), Internet Protocol (IP) address, security settings etc.) and credentials that may be used to connect to the provisioning server. The information to be received by the BWA compatible device during the bootstrapping process may then be used to configure the device to receive service from the provisioning server during the provisioning process.

In conventional BWA communication models, bootstrapping mechanisms are typically designed specifically for handsets (e.g., a cell phone), and may not be equally effective in bootstrapping other BWA compliant communication devices and operating systems. For example, in the Open Mobile Alliance—Device Management (OMA-DM) protocol (e.g., OMA-DM version 1.2), a provisioning server sends an unsolicited bootstrap message to the communication devices on a user datagram protocol (UDP) port 2948. A conventional handset (e.g., a cell phone) may be able to receive such an unsolicited bootstrap message on its UDP port 2948. However, the UDP port 2948 may not be a well known port for firewalls and host intrusion detection systems (HIDS) that may be operating on other communication devices, e.g., personal computers and laptops. Furthermore, a provisioning client on the communication device may not have full control over these firewalls/HIDS. As a result, the bootstrap message may be blocked by the firewall/HIDS of some of these other communication devices, thereby hindering the provisioning process.

Accordingly, some of the embodiments of the present invention employ a generic bootstrapping mechanism that would allow various device types (e.g., universal integrated circuit card (UICC), notebooks, personal computer (PC), ultra mobile PC (UMPC), or any other BWA compatible device) to receive a bootstrap message and would also allow provisioning protocol negotiation.

FIG. 1 is an exemplary block diagram illustrating a BWA network architecture 10 in accordance with various embodiments of the present invention. The network 10 of FIG. 1 includes a service provider (SP) network having one or more radio access networks (RANs) 20 and a core network 25.

A mobile station (MS) 15 may access the core network 25 via a radio link with a base station (BS) (e.g. BS 40, 42, etc.) in the RAN 20. The MS 15 may, for example, be a subscriber station using protocols compatible with the IEEE 802.16 standards (e.g., IEEE 802.16-2005 Amendment) or WiMAX standards. While FIG. 1 generally depicts the MS 15 as a cellular phone, in various embodiments the MS 15 may be a notebook, an ultra mobile PC (UMPC), a handheld mobile device, an universal integrated circuit card (UICC), a personal digital assistant (PDA), a Customer Premise Equipment (CPE), or other consumer electronics such as MP3 players, digital cameras, etc.

In some embodiments, communication with the MS 15 via RAN 20 may be facilitated via one or more access service network gateways (ASN-GWs) 45, although the embodiments are not limited to this specific type of network implementation. ASN-GW 45 (or other similar type of network node) may act as an interface between the core network 25 and its RANs 20. Thus, ASN-GW 45 may be connected to a plurality of base stations 40, 42 and may function as a type of BS controller and/or mobile switching center (MSC) to facilitate handover control and other functions for RAN 20, although the embodiments are not so limited.

The core network 25 may further include a provisioning server 50, a bootstrapping server 55, and/or a subscription server 60. In some embodiments, the provisioning server 50 may also act as a bootstrapping server, thereby eliminating the need of a separate bootstrapping server 55. Although not shown, the core network 25 may further include several other components, such as an authentication, authorization and accounting (AAA) server.

Figure 2:
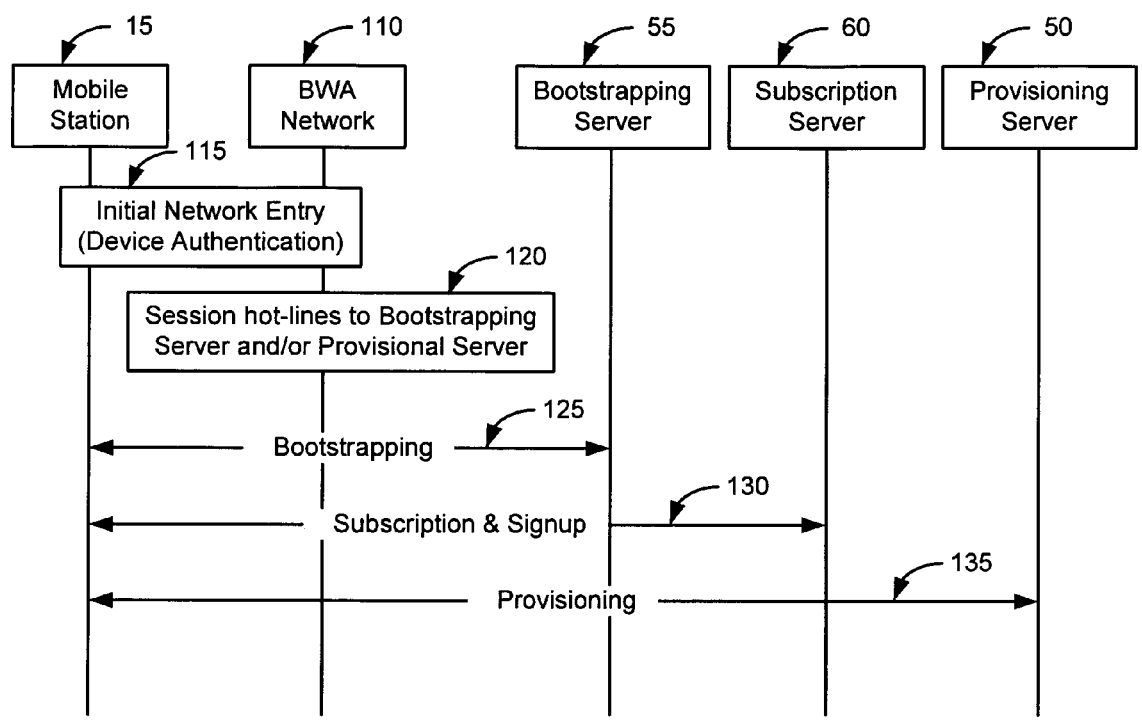
FIG. 2 is an exemplary flow diagram illustrating an over-the-air (OTA) bootstrapping and provisioning process in accordance with various embodiments of the present invention.

FIG. 2 is an exemplary flow diagram illustrating a bootstrapping and an over-the-air (OTA) provisioning process in accordance with various embodiments of the present invention. Referring to FIGS. 1 and 2, a non-provisioned device (e.g., the MS 15) may enter an SP's BWA network 110 at 115. The network entry 115 may include several operations (not shown) known to those skilled in the art, e.g., authenticating the MS 15. At 120, the ASN-GW 45 of the BWA network may hot-line the MS 15 to the bootstrapping server 55 and/or the provisioning server 50. Through the hot-lining process 120, the MS 15 may be directed to, and be able to access the bootstrapping server 55 and/or the provisioning server 50. At 125, the MS 15 may exchange bootstrap information with the bootstrapping server 55. At 130, the MS 15 may optionally subscribe to, and sign up with, the SP through the subscription server 60. The MS 15 may then exchange provisioning information with the provisioning server 50 during a provisioning process 135.

In some embodiments, bootstrapping 125 may be performed concurrently with the subscription and signup process 130, as will be discussed in further detail below.

Figure 3:
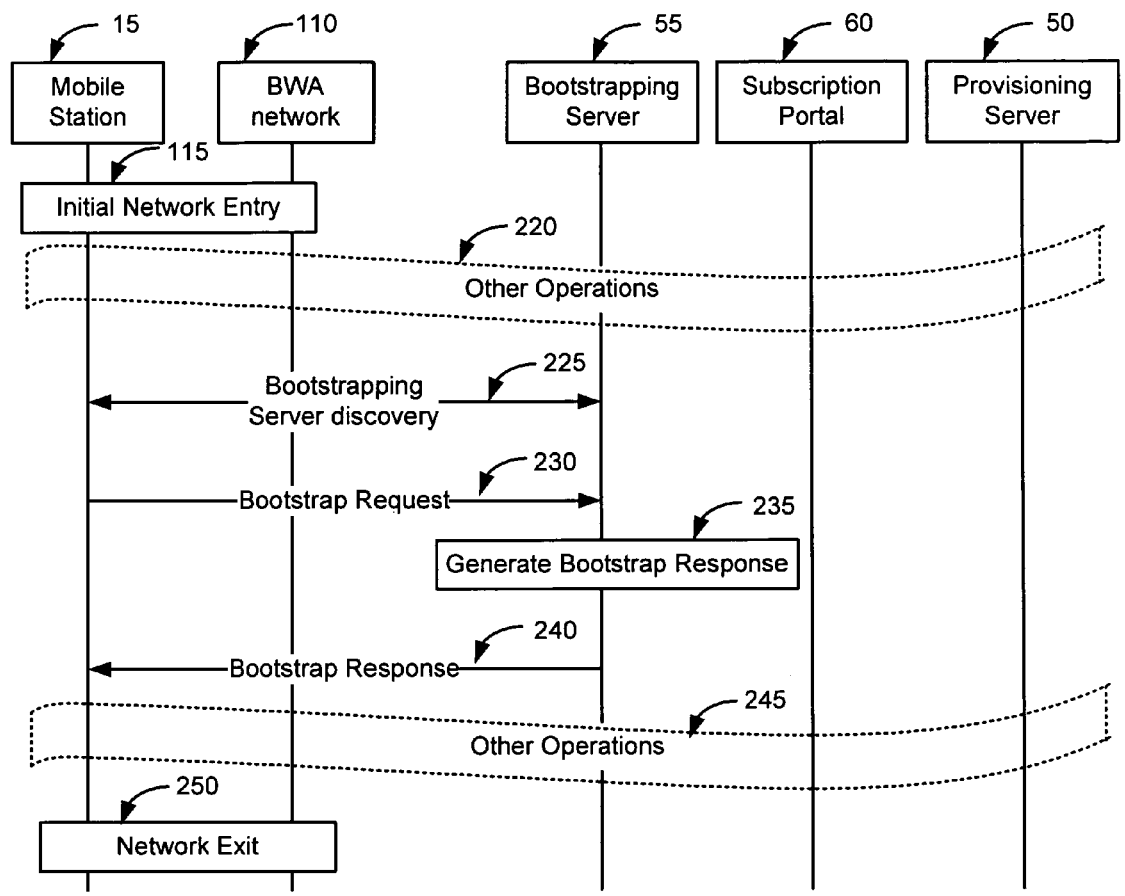
FIG. 3 is an exemplary flow diagram illustrating a bootstrapping process in accordance with various embodiments of the present invention.

FIG. 3 is an exemplary flow diagram illustrating a bootstrapping process in more details in accordance with various embodiments of the present invention. Referring to FIGS. 1-3, at 115, the MS 15 may enter the BWA network 110. At 220, various other operations may be performed, including but not limited to, authenticating the MS 15, determining whether the MS 15 has been provisioned earlier, etc.

At 225, the MS 15 may discover the bootstrapping server 55. Discovering the bootstrapping server 55 may include, but is not limited to, obtaining the bootstrapping server 55 address (e.g., IP address, URI, etc.) and obtaining other details about the server. The discovery of the server may be achieved by using, for example, a Domain name system (DNS) Service Record (SRV). The discovery of the servers may also be achieved employing other techniques, for example, by using a vendor specific option (e.g., option 43) in Dynamic Host Configuration Protocol (DHCP). Using a DNS SRV or a vendor specific option in DHCP is well known to those skilled in the art, and hence, will not be discussed in further detail. In some embodiments, the provisioning server 50 may also act as a bootstrapping server; in those cases, the provisioning server 50 may be discovered at 225 instead of discovering the bootstrapping server.

Once the MS 15 is aware (as a result of the discovery at 225) of the bootstrapping server 55 address and other details, the MS 15 may send a bootstrap request to the bootstrapping server 55 at 230. In some embodiments, the bootstrap request may include information such as the MS 15 identity (e.g., WiMAX—Media Access Control (MAC) address), one or more protocol(s) supported by MS 15 (e.g., OMA-DM, DSL Forum's Technical Report 069 protocol (TR069), native Extensible Markup Language (native XML), etc.), notification and polling capabilities supported by the MS 15 (e.g., Wireless Application Protocol-PUSH (WAP-PUSH), periodic-poll, checking at attachment-only, etc.), a type of the MS 15 (e.g. a notebook, a handheld mobile device, a PC, a PDA, a CPE, etc.), and/or an operating system (OS) of the MS 15 (e.g., Windows, Linux, etc.) and, optionally, its associated version.

In some embodiments, the bootstrap request may be transmitted using an appropriate protocol (e.g., Hyper Text Transfer Protocol (HTTP)) that is not blocked by any firewall/HIDS of the MS 15 (or any other firewall/HIDS between the MS 15 and the bootstrapping server 55).

When the bootstrap request is transmitted using HTTP, the MS 15 may utilize an HTTP header field (e.g., comment fields in the user agent of the header), a message body field, and/or other appropriate fields in the HTTP request to transmit some or all the bootstrap request information.

Once the bootstrapping server 55 receives such a request, the bootstrapping server 55 may select an appropriate provisioning protocol for provisioning the MS 15. The provisioning protocol selection may be based on some or all the information about the MS 15 received in the bootstrap request and/or a preference (or capabilities) of the SP. For example, in some embodiments, the selection of the provisioning protocol may be based at least in part on one or more protocol(s) supported by the MS 15 (e.g. OMA-DM, TR069, native XML, etc.) and the protocol(s) supported by the SP's network 10.

At 235, the bootstrapping server 55 may generate a bootstrap response. The bootstrap response may include the selected provisioning protocol, a bootstrap message, and/or other network related information. Some or all the information included in the bootstrap response may be encrypted using, for example, a bootstrap encryption key (BEK). The bootstrap message may include, for example, various information about the provisioning server (e.g., provisioning server URI, IP address, security settings etc.), security parameters, and/or any other appropriate information for provisioning the MS 15.

In some embodiments, the bootstrap response may be sent using any appropriate protocol (e.g., HTTP) that is not blocked by any firewall/HIDS of the MS 15 (or any other firewall/HIDS between the bootstrapping server 55 and MS 15). In some embodiments, the bootstrap response is transmitted using the HTTP. One or more appropriate fields (e.g., the header field, message field, etc.) of the HTTP bootstrap response may be utilized to transmit some or all the bootstrap response information.

Figure 4:
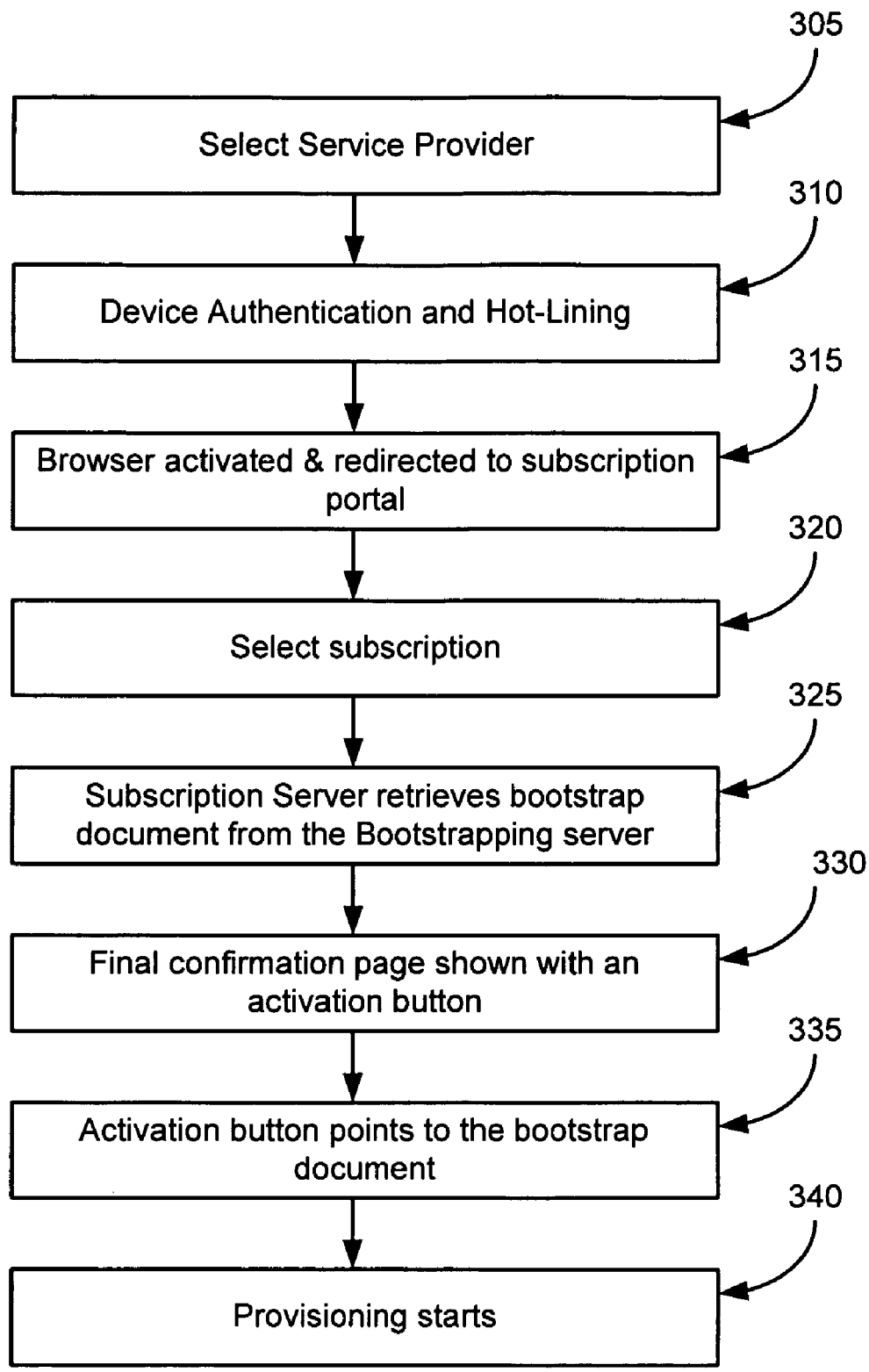
FIG. 4 is an exemplary flow diagram illustrating an integrated bootstrapping and subscription and signup process in accordance with various embodiments of the present invention.

In some embodiments, the bootstrapping process 125 (see FIG. 2) may be combined with (or embedded in) the subscription and signup process 130. FIG. 4 is an exemplary flow diagram illustrating an integrated bootstrapping and subscription and signup process in accordance with various embodiments of the present invention. Referring to FIGS. 1 and 4, at 305, the MS 15 or the user of the MS 15 may select an SP via an appropriate connection manager and transmit the selection to the selected SP's network. For example, the MS 15 may select the SP of the network 10 of FIG. 1. At 310, the MS 15 may be authenticated and hot-lined by the SP's network.

At 315, a browser may be activated in the MS 15 and the MS 15 may be redirected to a subscription portal residing in the subscription server 60 of the selected SP. In some embodiments, the browser may provide the MS 15 or its user a choice of different types of subscriptions. For example, a lower priced subscription may allow the MS 15 or its user access to the SP's network for a specific period of time (say, 6 or 12 hours), whereas a higher priced subscription may allow access to the network for a longer period of time (say, a week, or a month, i.e., a weekly or a monthly subscription). As would be readily appreciated by someone skilled in the art, numerous other subscription types may be envisioned. At 320, the MS 15 or its user selects an appropriate subscription using the activated browser, and the selection is transmitted to the subscription server 60.

In some embodiments, the MS 15 may also transmit (not shown in the figure) a bootstrap request to the subscription server 60 integrally or along with the transmission of the selection of the subscription at 320. The MS 15 may use the same browser connection to transmit the bootstrap request along with transmitting the selected subscription information. In some embodiments, during the subscription process, the MS 15 user may be requested to input (not shown in the figure) a variety of information (e.g., an user name, address, credit card number, contact details etc.) in the browser, and the bootstrap request may be transmitted to the subscription server 60 while transmitting the variety of information.

The subscription server 60 may pass (not shown in the figure) the bootstrap request to the bootstrapping server 55. In response to receiving the bootstrap request, the bootstrapping server 55 may select an appropriate provisioning protocol and generate (not shown in the figure) an appropriate bootstrap response, as discussed with respect to FIG. 3.

At 325, the subscription portal may retrieve the bootstrap response generated by the bootstrapping server 55. In the meantime, the browser in the MS 15 may display a confirmation page, at 330, to confirm and activate the selected subscription. Once the MS 15 or its user confirms the activation of the subscription, the subscription server 60 may transmit the bootstrap response to the MS 15. In some embodiments, the subscription portal may transmit a subscription confirmation page to the MS 15 confirming the subscription (or a thank-you page thanking the user of the MS 15 for the subscription, or any other appropriate page), which the MS 15 may display in the browser; the subscription server 60 may use the same browser connection to transmit the bootstrap response along with transmitting the subscription confirmation page information (or the thank-you page information) to MS 15.

Once the MS 15 receives the bootstrap response, provisioning server 50 may start the provisioning process, at 340, using an appropriate provisioning protocol (e.g. OMA-DM, TR069, native XML) selected during the generation of the bootstrap response. As discussed earlier, the bootstrap request and/or the bootstrap response may be sent using any appropriate protocol (e.g., HTTP) that is not blocked by the MS 15 firewall/HIDS (or any firewall/HIDS between the MS 15 and the subscription server 60/bootstrapping server 55).

In some embodiments, the provisioning server 50 may also act as the bootstrapping server. In these embodiments, the provisioning server may perform both the bootstrapping and the provisioning processes.

Figure 5:
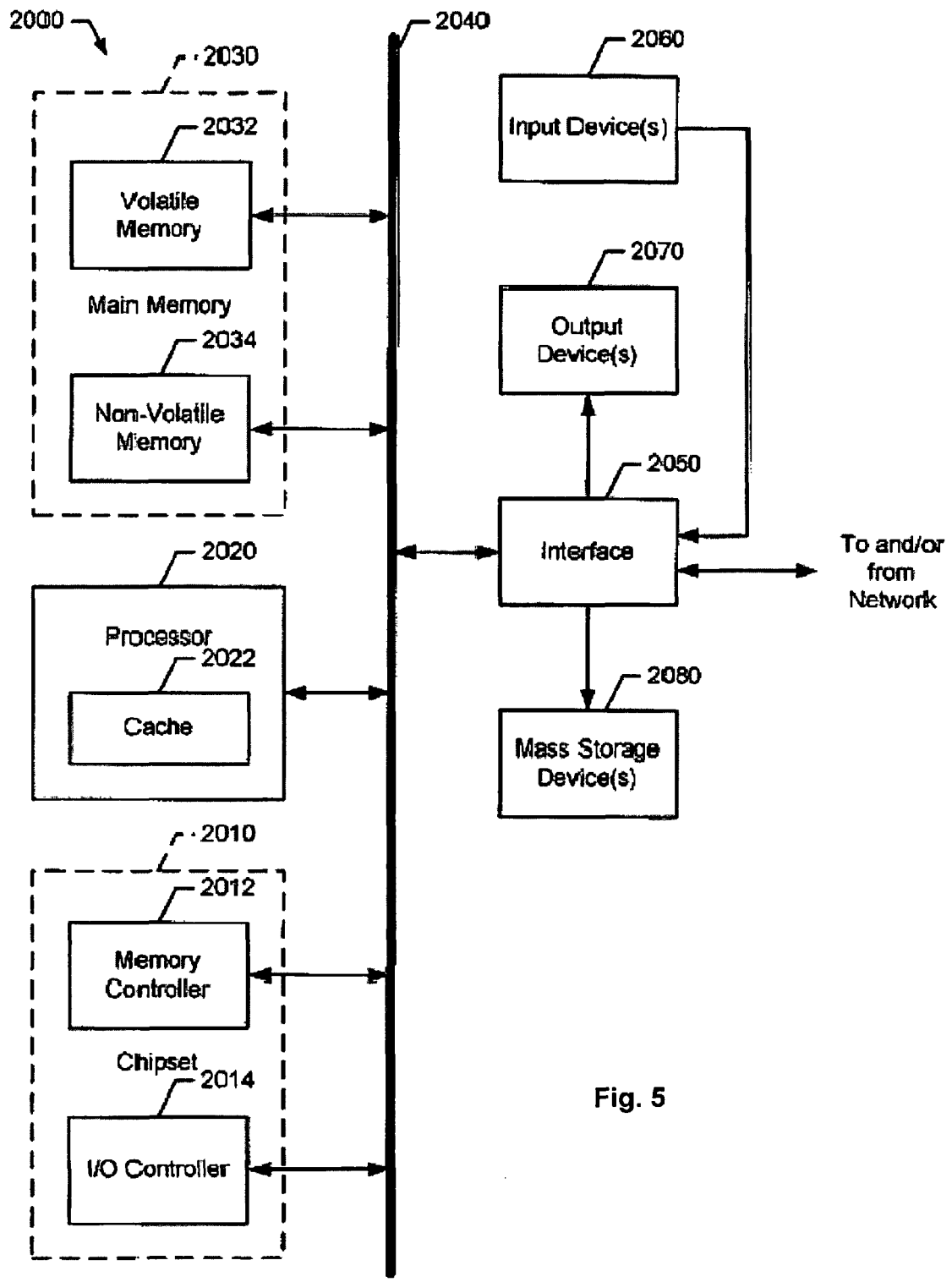
FIG. 5 is an exemplary block diagram representation of an example processor based system that may be used to practice various embodiments of the present invention.

FIG. 5 is an exemplary block diagram representation of an example processor based system 2000 that may be used to practice various embodiments of the present invention. The processor system 2000 may be a desktop computer, a laptop computer, a handheld computer, a tablet computer, a PDA, a server, an Internet appliance, and/or any other type of computing device. In some embodiments, the processor system 2000 may be capable of functioning as the MS 15, the provisioning server 50, the bootstrapping server 55, and/or the subscription server 60.

The processor system 2000 illustrated in FIG. 5 includes a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WLAN components, WMAN components, WWAN components, and/or other suitable processing components. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by synchronous dynamic random access memory (SDRAM), dynamic random access memory (DRAM), RAMBUS dynamic random access memory (RDRAM), and/or any other type of random access memory device. The non-volatile memory 2034 may be implemented using flash memory, read only memory (ROM), electrically erasable programmable read only memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of interface. In various embodiments, the interface circuit 2050 may be incorporated with the earlier describe generic bootstrap teachings. In various embodiments, some of the teachings may be implemented in other components, e.g. I/O controller 2014.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

In some embodiments, the processor system 2000 may be coupled to an antenna structure (not shown in the figure) to provide access to other devices of a network. In some embodiments, the antenna structure may include one or more directional antennas, which radiate or receive primarily in one direction (e.g., for 120 degrees), cooperatively coupled to one another to provide substantially omnidirectional coverage; or one or more omnidirectional antennas, which radiate or receive equally well in all directions. In some embodiments, the antenna structure may include one or more directional and/or omnidirectional antennas, including, e.g., a dipole antenna, a monopole antenna, a patch antenna, a loop antenna, a microstrip antenna or any other type of antennas suitable for OTA transmission/reception of RF signals.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 5 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
  discovering wirelessly, by a mobile station, a remotely disposed bootstrapping server equipped to provide information relating to a location of a provisioning server equipped to provide provisioning service to mobile stations;

transmitting wirelessly, by the mobile station over a Worldwide Interoperability for Microwave Access (WiMAX) network, a bootstrap request using Hypertext Transfer Protocol (HTTP) to the bootstrapping server, requesting bootstrap information to bootstrap the mobile station to receive provisioning service from a provisioning server associated with the bootstrapping server, the bootstrap request including information about the mobile station, wherein the transmitting comprises transmitting the bootstrap request such that the bootstrap request is configured to be transmissible through one or more firewalls operating on the mobile station; and receiving wirelessly, by the mobile station over the WiMax network, bootstrap response from the bootstrapping server in response to the transmitted bootstrap request, the bootstrap response including information relating to the location of the provisioning server or credentials to connect to the provisioning server.

2. The method of claim 1, wherein the bootstrap request includes an identity of the mobile station, one or more protocols supported by the mobile station, notification capabilities supported by the mobile station, a type of the mobile station, or an identify of an operating system of the mobile station.

3. The method of claim 1, wherein the bootstrap response includes information related to
one or more selected provisioning protocols, a bootstrap message encrypted with a bootstrap encryption key (BEK), or network related information.

4. The method of claim 1, wherein the discovering comprises:
discovering the bootstrapping server using a Domain name system (DNS) Service Record (SRV) or a Dynamic Host Configuration Protocol (DHCP).

5. The method of claim 1, further comprising:
transmitting by the mobile station a selection of a subscription to a subscription server for using a Worldwide Interoperability for Microwave Access (WiMAX) network.

6. The method of claim 5, wherein the transmitting of the bootstrap request and the transmitting of the selection of the subscription comprises integrally transmitting the bootstrap request along with the selection of the subscription.

7. A method comprising:
authenticating by a bootstrapping server, a remotely disposed mobile station;
receiving wirelessly, by the bootstrapping server, a bootstrap request from the mobile station, requesting configuration data to bootstrap the mobile station to receive provisioning service from a provisioning server associated with the bootstrapping server, the bootstrap request including information about the mobile station; and
transmitting wirelessly, by the bootstrapping server, a bootstrap response to the mobile station in response to the received bootstrap request, the bootstrap response including information relating to a location of the provisioning server or credentials to connect to the provisioning server.

8. The method of claim 7, further comprising:
receiving wirelessly by the bootstrapping server, a subscription request from the mobile station for using a Worldwide Interoperability for Microwave Access (WiMAX) network.

9. The method of claim 8, further comprising:
integrally receiving by the bootstrapping server, said subscription request along with said bootstrap request.

10. The method of claim 7, further comprising:
selecting by the bootstrapping server, a provisioning protocol based at least in part on information included in the bootstrap request; and
including by the bootstrapping server, information related to the selected provisioning protocol in the bootstrap response.

11. The method of claim 7, wherein the bootstrap response further includes information related to one or more selected provisioning protocols, a bootstrap message encrypted with a bootstrap encryption key (BEK), or network related information.

12. A method comprising:
selecting, by a mobile station, a subscription to a service provided by a service provider;
transmitting wirelessly, by the mobile station, the selection, using a browser connection, to a remotely disposed subscription server associated with the service provider;
transmitting wirelessly, by the mobile station, a bootstrap request to the subscription server utilizing said browser connection, the bootstrap request requesting bootstrapping information to bootstrap the mobile station to receive provisioning service from a provisioning server associated with the service provider, the bootstrap request including information about the mobile station;
transmitting wirelessly, a confirmation to the subscription, by the mobile station to the subscription server; and
receiving wirelessly, in response to transmitting the confirmation, by the mobile station, a bootstrap response from the subscription server, the bootstrap response comprising at least in part information relating to the provisioning server.

13. The method of claim 12, wherein receiving the bootstrap response further comprises:
receiving the bootstrap response from the subscription server utilizing said browser connection.

14. The method of claim 12, further comprising:
configuring the mobile station, in response to the received bootstrap response, to receive the provisioning service from the provisioning server; and
provisioning the mobile station in response to said configuring the mobile station.

* * * * *